United States Patent
Kawakami et al.

(10) Patent No.: US 7,798,123 B2
(45) Date of Patent: Sep. 21, 2010

(54) INTERNAL COMBUSTION ENGINE CONTROL DEVICE

(75) Inventors: Teruaki Kawakami, Tokyo (JP); Hitoshi Inoue, Tokyo (JP); Ryohei Takahashi, Hyogo (JP); Morio Fujiwara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 966 days.

(21) Appl. No.: 11/584,508

(22) Filed: Oct. 23, 2006

(65) Prior Publication Data

US 2007/0266772 A1    Nov. 22, 2007

(30) Foreign Application Priority Data

May 18, 2006 (JP) .............................. 2006-139060

(51) Int. Cl.
*F02P 5/00* (2006.01)
(52) U.S. Cl. ................. 123/406.26; 123/435; 73/114.52
(58) Field of Classification Search ................. 123/672, 123/435, 406.26, 406.27, 406.3; 701/102, 701/103, 110, 111; 73/114.08, 114.52, 114.53; 702/182, 183
See application file for complete search history.

(56) References Cited

U.S. PATENT DOCUMENTS

| | | | |
|---|---|---|---|
| 5,343,844 A * | 9/1994 | Fukui et al. | 123/481 |
| 6,032,650 A * | 3/2000 | Rask | 123/435 |
| 6,186,129 B1 * | 2/2001 | Butler, Jr. | 123/620 |
| 6,318,152 B1 * | 11/2001 | Hagihara et al. | 73/35.02 |
| 6,768,308 B2 * | 7/2004 | Hanazaki et al. | 324/378 |
| 6,925,374 B2 * | 8/2005 | Matsushita et al. | 701/114 |
| 6,968,825 B2 * | 11/2005 | Hitomi et al. | 123/406.11 |
| 7,021,285 B2 * | 4/2006 | Maeda et al. | 123/406.26 |
| 2004/0230369 A1 * | 11/2004 | Tanaya et al. | 701/114 |
| 2007/0079817 A1 * | 4/2007 | VanDyne et al. | 123/568.21 |

FOREIGN PATENT DOCUMENTS

JP    11-336650 A    12/1999

\* cited by examiner

*Primary Examiner*—Stephen K Cronin
*Assistant Examiner*—Johnny H Hoang
(74) *Attorney, Agent, or Firm*—Sughrue Mion, PLLC

(57) ABSTRACT

An ion current corresponding to an amount of ion produced by combustion of air fuel mixture in a combustion chamber of an internal combustion engine is detected and an ion current parameter indicative of combustion state is calculated from the ion current. The properties of fuel are determined by a change of combustion state from an engine start time, that is, by a change of the ion current parameter.

10 Claims, 15 Drawing Sheets

INTERNAL COMBUSTION ENGINE CONTROL DEVICE

BACKGROUND OF THE INVENTION

1. Field of the Invention

The present invention relates to an internal combustion engine control device for determining properties of fuel according to a change of combustion state, which is calculated on the basis of ion current generated by combustion of a fuel air mixture within a cylinder of the engine after an internal combustion engine is started.

2. Background Art

In a usual gasoline engine, the so-called inlet port fuel injection in which an injector is arranged in an intake port to inject fuel toward an intake valve, is used. In the inlet port fuel injection, substantial portion of injected fuel is directly sucked in a combustion chamber and the remaining fuel is temporarily stuck to the intake valve and/or the intake port and then evaporated and sucked in the combustion chamber. As a result, the amount of fuel sucked in the combustion chamber is changed depending upon evaporation rate of the fuel and the amount of fuel attributing to combustion becomes different even when the amount of injected fuel is constant.

Evaporation rate of fuel is substantially influenced by the property of fuel and the temperature of an intake port portion. Property of commercial gasoline varies in seasons and by gasoline makers. Evaporation rates of low evaporated fuel, such as Summer Gasoline, which is thought as having bad vaporizing rate, and high evaporated fuel, such as Winter Gasoline, which has standard vaporizing rate, with respect to temperature will be described with reference to FIG. 2, in which abscissa shows recovered temperature (fuel temperature) and ordinate shows vaporizing rate (distillated amount). From FIG. 2, it is clear that, although there is no difference in vaporizing rate when distillated temperature (fuel temperature) is a predetermined temperature or higher, vaporizing rate of low evaporated fuel is bad when temperature is low. The vaporizing rates of these fuels tend to be lowered with the lowering of temperature.

When low evaporated fuel is used in a bad vaporizing rate situation such as, for example, low temperature in the vicinity of the intake port, an amount of fuel stuck to the vicinity of the intake port is increased compared with high evaporated fuel with respect to the amount of fuel injected by the injector and an amount of fuel sucked to the combustion chamber, that is, fuel attributing to combustion, is reduced, so that the air fuel ratio becomes lean and combustion is degraded. As a result, idle variation may occur and, in the worst case, stalling of engine may occur. Therefore, the amount of fuel injection is set to a large value so that idle variation or engine stall do not occur in starting a cold internal combustion engine, in which influence of kind of fuel is large, even when low evaporated fuel having low vaporizing rate is used. That is, the problem is solved by increasing the amount of fuel attributing to combustion by increasing the amount of fuel injection.

When high evaporated fuel having standard vaporizing rate is used in the situation in which the amount of fuel injection is set for low evaporated fuel, the amount of fuel sucked in the combustion chamber is larger than that when low evaporated fuel is used. Therefore, the amount of fuel attributing to combustion becomes too much, resulting in that the amount of unburned hydrocarbon exhaust gas is increased.

For example, JP-A-11-336650 discloses a technique in which, when low evaporated fuel is used in cold first idle state, the characteristics of fuel and the state of combustion are detected by detecting reduction of ion current generated when air fuel ratio becomes lean and engine rotation speed is lowered and the amount of fuel injection is corrected correspondingly to the characteristics of fuel and the state of combustion. That is, the combustion state is determined on the basis of the number of times when the amount of ion current generated by fuel combustion in a combustion chamber becomes a reference value or less and the appropriate amount of fuel is obtained by correcting the amount of fuel to the amount of fuel injection corresponding to the combustion state.

SUMMARY OF THE INVENTION

As to rotation speeds of engine at the start thereof when low evaporated fuel is used and when high evaporated fuel is used, reduction of rotation speed occurs due to the difference of fuel and ion current reduction occurs after about tenth ignition from the engine start, as shown in FIG. 4. Therefore, in order to measure the frequency of ion current reduction by using the determination method of properties of fuel disclosed in JP-A-11-336650, a time period corresponding to several ignitions is necessary after about the tenth ignition. Since the frequency of ion current reduction can not be measured in the period of ten and several ignitions, the rotation speed is further reduced and the idle variation becomes large.

An internal combustion engine control device of the present invention was made in order to solve the above described problem and an object of the present invention is to determine the properties of fuel by variation of combustion after an engine start time calculated on the basis of ion current generated by combustion of air fuel mixture in combustion chamber.

The internal combustion engine control device of this invention comprises an ion current detector for detecting ion current corresponding to an amount of ion generated by combustion of air fuel mixture in a cylinder of the internal combustion engine and an ion current parameter calculation unit for calculating ion current parameter indicative of combustion state in each ignition from the detected ion current, and determines the property of fuel according to a variation of the ion current parameter within a time corresponding to a predetermined number of ignitions from engine start.

According to the present invention, the fuel condition can be determined at early timing after the engine start by detecting change of ion current parameter and idle variation and unburned hydrocarbon exhaust can be restricted by executing a fuel control corresponding to the fuel condition and an ignition timing control, etc.

DETAILED DESCRIPTION OF THE PREFERRED EMBODIMENTS

Embodiment 1

Figure 1:
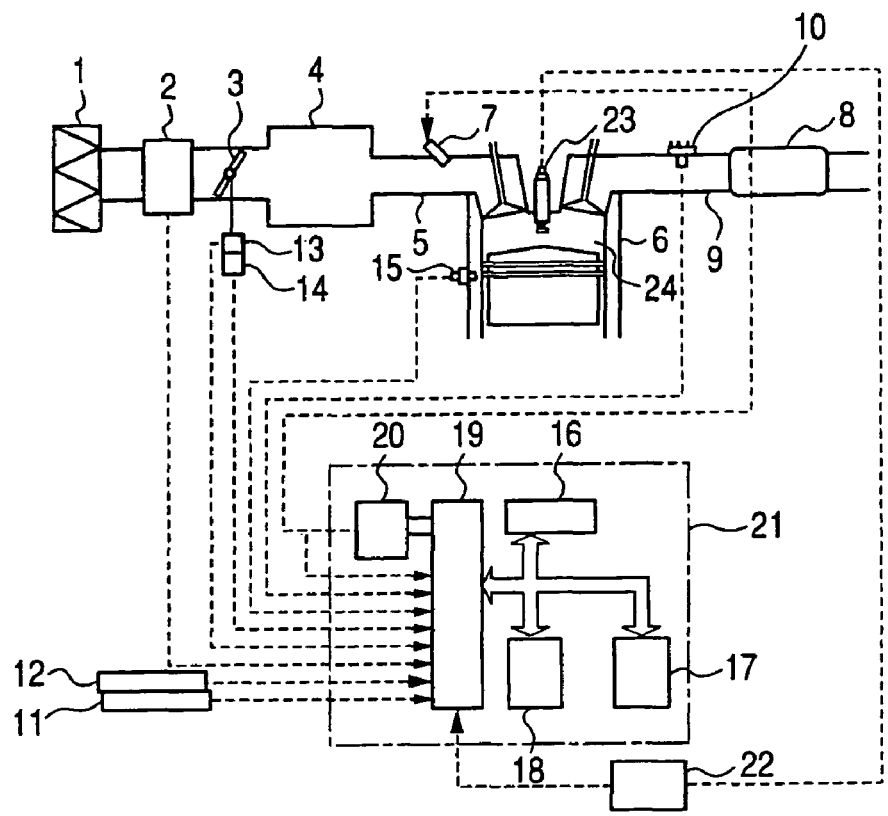
FIG. 1 shows an internal combustion engine control device according to an embodiment of the present invention.
Figure 2:
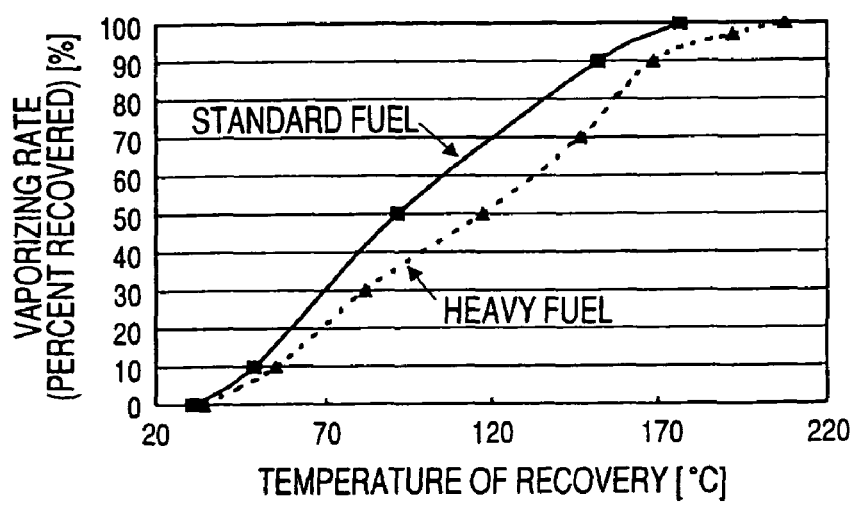
FIG. 2 is a graph for explaining vaporizing ratios of fuels.

Now, a first embodiment of the present invention will be described. FIG. 1 shows a whole control device applied to an internal combustion engine of an automobile. In FIG. 1, a reference numeral 6 depicts an engine body, 5 an intake pipe connected to an intake port of the engine 6 and 9 an exhaust pipe connected to an exhaust port. The intake pipe 5 is connected to an intake passage through a surge tank 4. An air cleaner 1 includes a filter for removing dust contained in air taken in the intake passage and an air flow sensor 2 is, for example, a hot wire type air flow sensor and generates a voltage signal corresponding to an amount of mass flow of intake air. A throttle valve 3 is ganged with an accelerator pedal, which is not shown, and regulates an amount of intake air. Further, a potentiometer is included in the vicinity of the throttle valve 3 and a throttle valve opening sensor 13 for detecting a throttle valve opening is provided. A reference numeral 14 depicts an idle switch and detects a full closing of the throttle valve.

A crank angle sensor 11 outputs a pulse signal every constant rotation of a crank shaft of the engine 6. A cam angle sensor 12 outputs a pulse signal every constant rotation of a camshaft of the engine 6. For example, the crank angle sensor 11 outputs a pulse for rotation angle detection every crank rotation angle of 10°. Since a cam angle sensor 12 outputs different signals for cylinders, it is possible to specify cylinders by combining the cam angle signal with the signal from the crank angle sensor 11.

A fuel injection valve 7 is provided for each cylinder of the intake pipe 5. The fuel injection valve 7 is opened according to a signal of an ECU (Engine Control Unit) 21 to inject pressurized fuel to the intake ports of the respective cylinders. Air fuel mixture consisting of the injected fuel and air flowing through the intake pipe 5 is introduced into a combustion chamber 24 and ignited by a ignition plug 23. Burned air fuel mixture (exhaust gas) is guided to an exhaust pipe 9 and three components HC (hydrocarbon), NOx (nitrogen oxides) and CO (carbon mono-oxide) in the exhaust gas are simultaneously purified by a catalyst converter 8 housing a three way catalyst arranged in the exhaust pipe 9. Further, an air fuel ratio sensor 10 is provided on an upstream side of the catalyst converter 8 to detect air fuel ratio linearly on the basis of concentration of oxygen contained in the exhaust gas.

On the other hand, the ECU 21 provided in, for example, a compartment of a vehicle is a micro computer system for executing a fuel injection control, an ignition timing control, etc., and is constructed with an input/output interface 19, a central processing unit 16, a ROM 17, a RAM 18 and a drive circuit 20. The described various sensors and switches are connected to an input side of the ECU 21 and outputs of these sensors are A/D-converted through an interface and taken in the ECU. A calculation processing is executed on the basis of these input signals. On the basis of a result of this calculation, control signals for various actuators such as the injection valves 7 and the ignition plugs 23 are outputted to control the actuators.

In the ignition timing control, the engine state is totally determined by the engine rotation speed from the crank angle sensor 11 and signals from other sensors, the optimum ignition timing is determined and the ignition plug 23 is controlled by an ignition signal, which is not shown, through the drive circuit 20.

Figure 3:
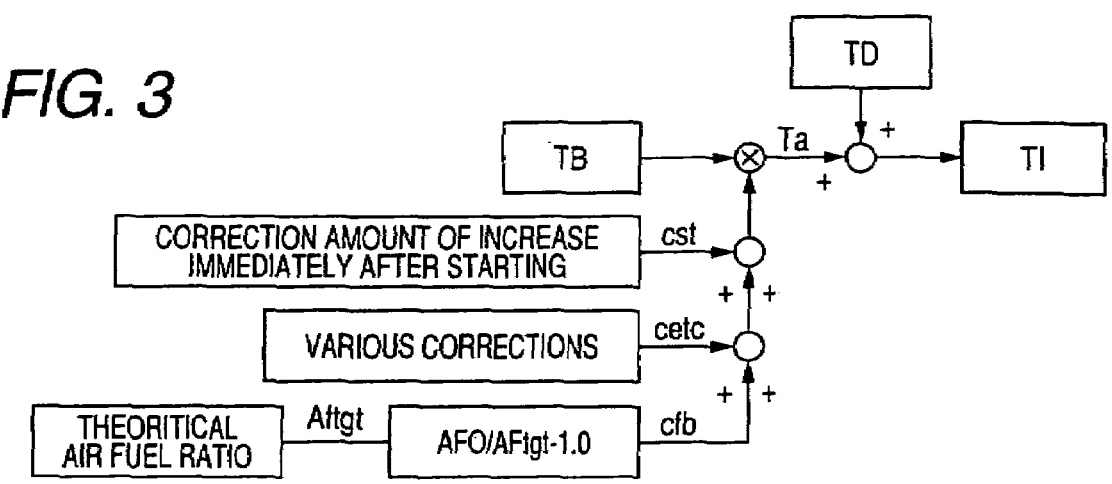
FIG. 3 is a block diagram of a fuel injection control.
Figure 4:
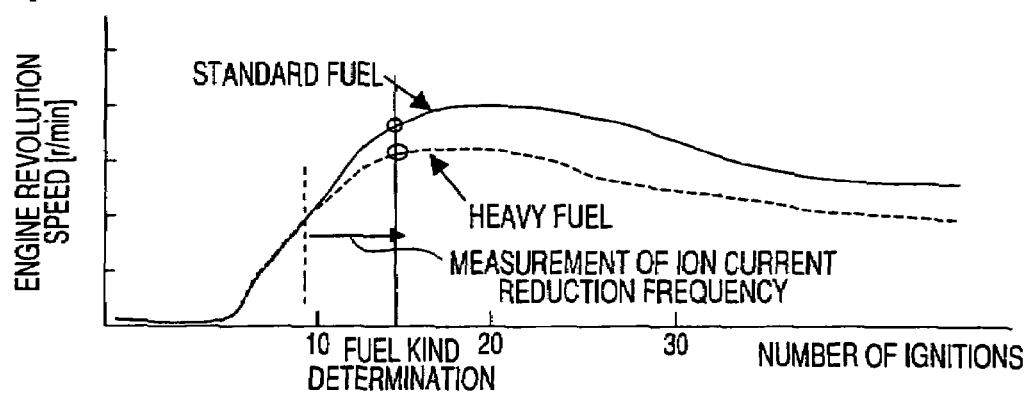
FIG. 4 is a graph showing engine rotation speeds when different fuels are used.

Next, the fuel injection control will be described with reference to a block diagram shown in FIG. 3. The ECU 21 shown in FIG. 1 A/D-converts an output of the air flow sensor 2, reads it, integrates an amount of intake air in a signal section of the crank angle sensor 11 and calculates an amount of intake air A/N0 for one intake stroke. In order to simulate a response delay in the surge tank 4, the amount of intake air A/N into the cylinder is calculated by filtering the amount of intake air A/N0 primarily. A basic fuel injection amount TB (FIG. 3) is calculated such that A/N thus obtained becomes theoretical air fuel ratio.

Against the increase of friction torque due to degradation of vaporizing rate of fuel and the increase of viscosity of various oils at an engine start time, a supplementary correction: cst is performed immediately after the engine start. The lower the engine cooling water temperature detected by a water temperature sensor 15 is usually the larger the cst. Further, other fuel amount of fuel correction cetc are calculated. Further, other than the engine start, an amount of air fuel ratio feedback correction: cfb is added to correct air fuel ratio when real air fuel ratio: AFO detected by the air fuel ratio sensor 1 is out of theoretical air fuel ratio: Aftgt due to external disturbance occurred in the engine.

An effective injection amount of fuel Ta is calculated by correcting the basic injection amount of fuel TB using the correction amounts thus obtained. Further, an ineffective injection amount of fuel TD is added to correct the open valve delay time of the fuel injection valve 7 and, after a real injection amount of fuel TI is calculated, the fuel injection valve 7 is driven through a drive circuit 20.

Further, an ion current detection circuit 22 is provided in this internal combustion engine to detect a combustion state on the basis of ion generated in the combustion chamber 24 after combustion. Ion is generated when the air fuel mixture is burned. Ions generated in the combustion chamber 24 flow by applying a bias voltage from a bias circuit, which is provided in the ion current detection circuit 22 and is not shown, to the ignition plug 23 and is detected by the ion current detection circuit 22 as an ion current.

With the above mentioned construction of the internal combustion engine, it becomes possible to perform, at the start time of the internal combustion engine, the fuel proportions and condition determination from change of combustion state from the engine start, which is calculated on the basis of the ion current generated by burning of air fuel mixture in the combustion chamber.

Figure 5A:
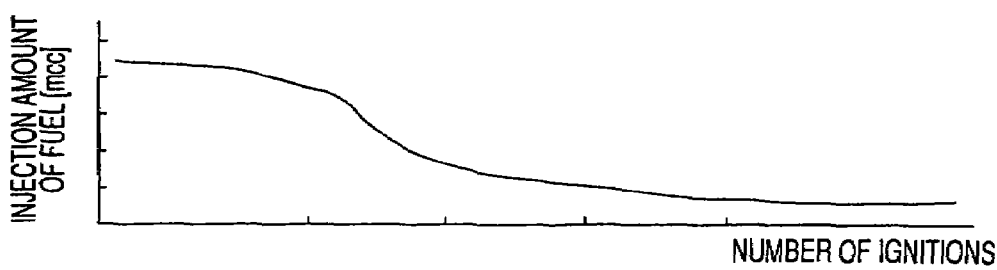
FIGS. 5A and 5B are graphs showing an amount of fuel injection and an ion current parameter for every ignition after an engine start.
Figure 5B:
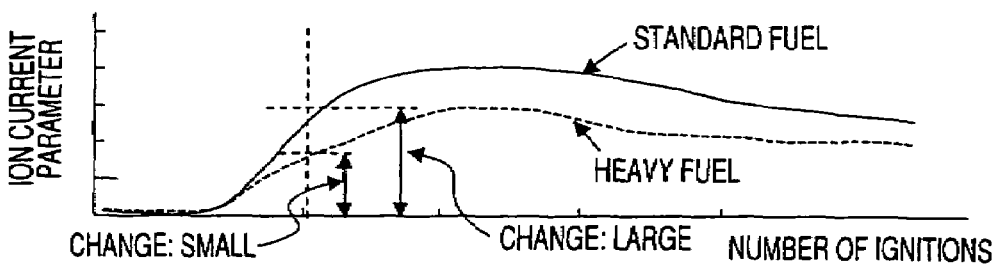

FIG. 5 shows ion current parameter behavior at every ignition from the engine start. A solid line shows the ion current parameter when high evaporated fuel is used and a dotted line shows the ion current parameter when low evaporated fuel is used. Even when the amount of fuel injection is the same regardless of the fuel characteristics as shown in FIG. 5(*a*), the change of ion current parameter of the high evaporated fuel from the engine start time is large as shown in FIG. 5(*b*). The difference in behavior of ion current parameter between high evaporated fuel and low evaporated fuel results from the difference in vaporizing rate between fuel conditions and the difference in behavior occurs because, even when amounts of the fuels injected from the injector are the same, amounts of fuels sucked into the combustion chamber, that is, amounts of fuel attributing to combustion, are different. When high evaporated fuel having good vaporizing rate is used, the amount of fuel attributing to combustion is large, so that combustion state becomes good and ion current indicative of combustion state becomes large.

On the other hand, when low evaporated fuel having bad vaporizing rate is used, the amount of fuel attributing to combustion is small compared with high evaporated fuel, so that combustion state is bad and ion current value indicative of burning state becomes small. Further, when high evaporated fuel having good vaporizing rate at every ignition is used, temperature in the vicinity of intake port tends to rise and fuel vaporizing rate is increased quickly compared with low evaporated fuel. Therefore, the tendency of improving combustion state at every ignition becomes considerable and appears as change in ion current parameter from the engine start. On the other hand, since, when low evaporated fuel having bad vaporizing rate is used, combustion state is bad and temperature in the vicinity of intake port does not rise quickly, change of ion current parameter from the engine start is small. According to the present invention, the properties of fuel is determined by using behavior of the fuel combustion state after the engine start, which depends on vaporizing rate of fuel, in concrete, difference in change of ion current parameter after the engine start.

Next, the determination of properties of fuel according to a first embodiment of the present invention will be described in detail with reference to flowcharts. The determination of properties of fuel is performed by calculating ion current parameter indicative of combustion state on the basis of ion current by using an ion current parameter calculation routine shown in FIG. 7 and detecting change of combustion state after the engine start on the basis of ion current parameter by using a fuel proportions and condition determination routine shown in FIG. 8.

First, the ion current parameter calculation routine executed at every crank angle of 0.5 deg of the internal combustion engine or at every predetermined time corresponding to the crank angle will be described with reference to a flowchart shown in FIG. 7. In the step S101, it is confirmed that an idle flag, which is set in idle time, is set (xidle=1) and that engine cooling water temperature is a predetermined temperature or lower (xwt≦predetermined temperature), that is, cold first idle. When it is out of the cold first idle, the engine is warmed and temperature in the vicinity of the intake port and fuel temperature are high. Therefore, the difference of fuel condition is hardly reflected to change of burning state and all parameters related to this embodiment are initialized in the step S109 and the routine is ended.

When it is the cold first idle, a determination for detecting ion current from the ignition time to a predetermined section (dCrk) is executed in the step S102. For example, when dCrk is 100, ion current between the ignition time and a time at which crank angle becomes 100 deg is processed in the step S103 and steps following the step S103 and, when the ignition timing is changed, the detection of only ion current in the predetermined section (dCrk) to which the combustion state is reflected becomes possible. Within the predetermined section (dCrk), ion current (ion) is detected by the ion current detection circuit as ion current parameter representing the combustion state in the step S103 and the ion current value (ion) and a processing period (sample_deg) of this routine are integrated in the step S104.

Incidentally, it may be possible to use known peak value of ion current representing combustion state as the ion current parameter instead of the integrated ion current. Next, it is determined in the step S105 whether or not the ignition timing becomes in the predetermined section. At a time when the ignition timing becomes in the predetermined section, the number of ignitions (n) is updated in the step S106 and ion current parameter (Sion) at every ignition is recorded in an ion current parameter memory (Ion_Store (n)) in the step S107. Incidentally, since the number of records (n) is the number of records of ion current parameter generated by ignitions, the number of records is the same as the number of ignitions. Next, the calculated ion current parameter is initialized in the step S108 to provide for calculation of ion current parameter generated in a next ignition.

Now, the fuel proportions and condition determination routine executed every half rotation of the internal combustion engine will be described with reference to a flowchart shown in FIG. 8. First, similarly to the ion current parameter calculation routine, the cold first idle determination is executed in the step S201. When it is out of the determination, the fuel proportions and condition determination is not executed and the routine is ended. When it is the cold first idle, the control parameter (fuel) detection routine shown in FIG. 9 is executed in the step S202 to detect the amount of fuel injection. In FIG. 9, the effective injection amount of fuel (Ta), which does not contain ineffective injection amount of fuel shown in FIG. 3, is detected in the step S401, the number (k) of records is updated in the step S402, the effective injection amount of fuel (Ta) is recorded in a fuel injection amount memory (Ta_Store(k)) in the step S403 and then the operation is returned to the fuel condition determination routine.

Figure 10:
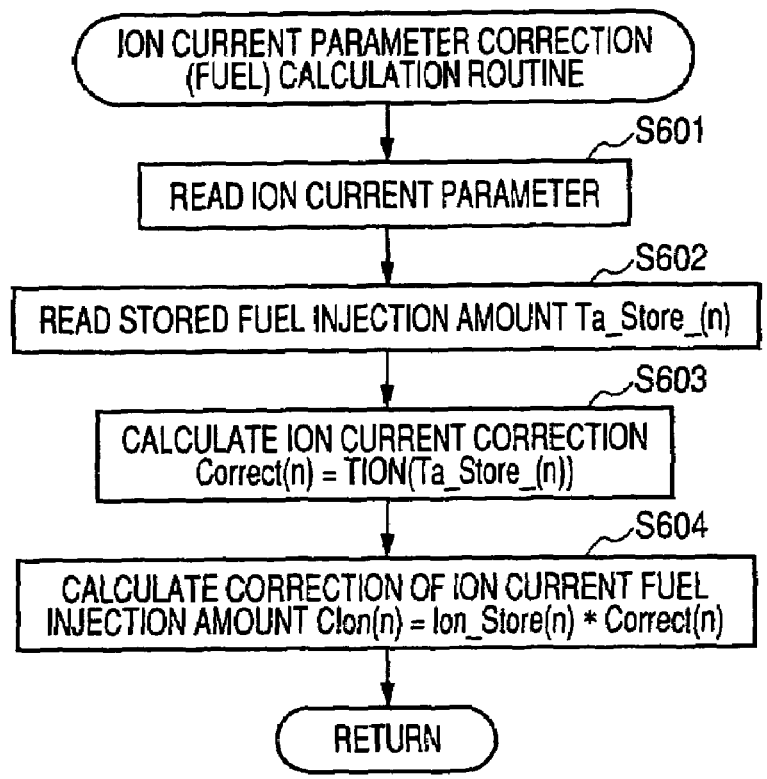
FIG. 10 is a flowchart showing the ion current parameter correction (fuel) calculation routine used in the first embodiment to the third embodiment of the present invention.

By this routine executed every half rotation of the engine, the injection amounts of fuel of all of the cylinders are sequentially stored in the fuel injection amount memory (Ta_Store(k)), which is used in correcting the ion current parameter correspondingly to the amount of fuel injection, as to be described later. Returning to the fuel proportions and condition determination routine shown in FIG. 8, it is determined in the step S203 whether or not the ion current parameter is detected (n>0) by the number of records (n) in the step S106 of the ion current parameter routine (FIG. 7). Fuel is injected in the exhaust stroke or the intake stroke and, since the ignition timing is in the compression stroke after a half or one rotation, fuel injected at the cranking start time is not ignited yet and there is a timing in which ion current is not detected. When ion current is not detected, this routine is ended. When it is determined in the step S203 that the ion current parameter is detected, the ion current parameter correction (fuel) calculation routine shown in FIG. 10 is executed to correct the ion current parameter recorded in the ion current parameter calculation routine correspondingly to the amount of fuel injection in the step S204.

The internal combustion engine control device of the present invention includes the fuel injection amount detection unit for detecting the amount of fuel injection and the ion current parameter is corrected on the basis of the amount of fuel injection detected by the fuel injection amount detection unit.

Figure 6:
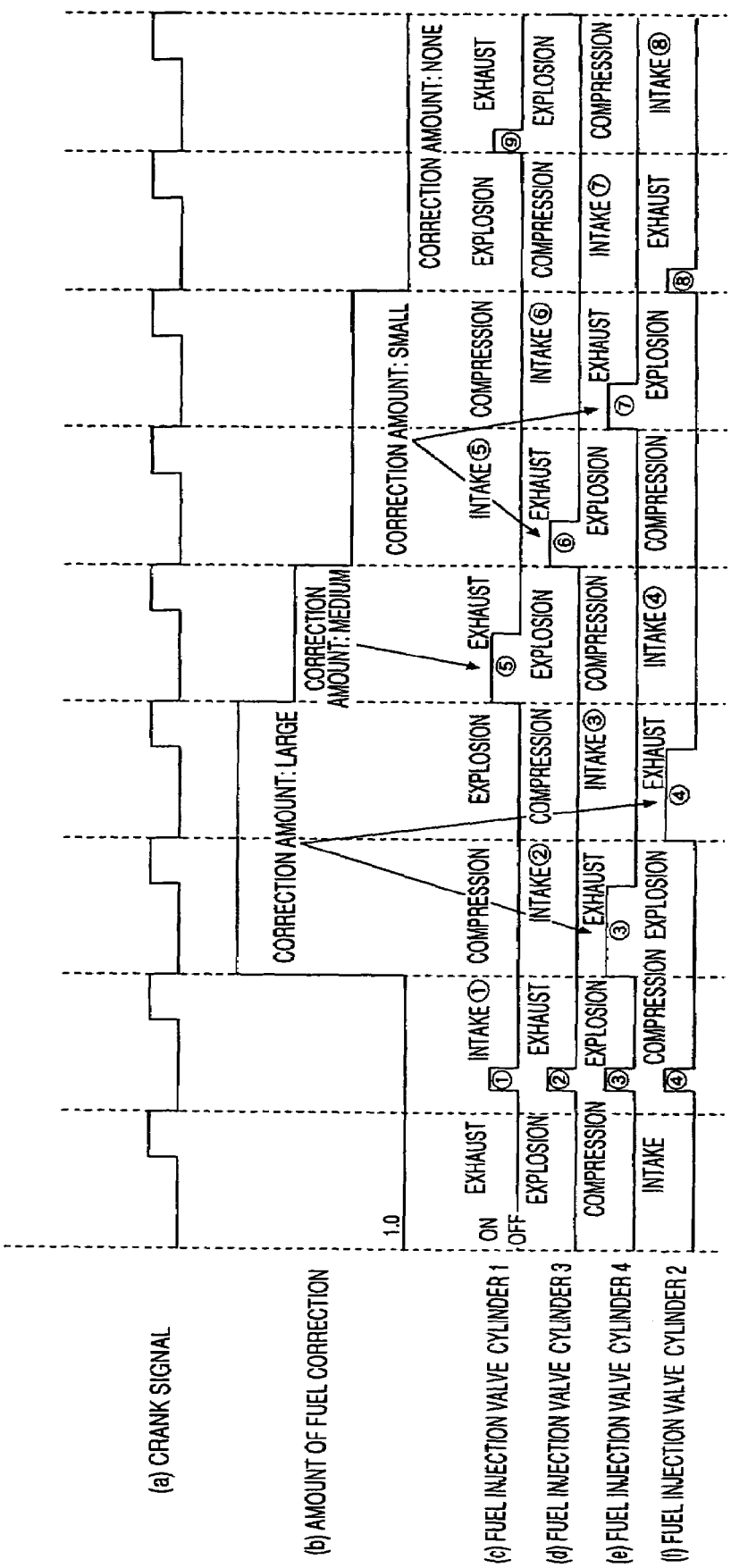
FIG. 6 shows the amount of fuel injection and the injection pattern at a cold engine starting.

Now, the amount of fuel injection and the injection pattern in the cold engine starting will be described with reference to FIG. 6. At the cold engine starting of the internal combustion engine, friction torque is increased due to large viscosity of various oils of the engine and vaporizing rate of fuel is degraded due to low temperature in the vicinity of the intake port as described previously. Therefore, it is usual to hold enough amount of fuel sucked in the cylinder by performing the supplementary correction shown in FIG. 6(*b*) to thereby increase the combustion torque.

Thereafter, a control for reducing the amount of correction with warming-up of the engine, that is, with reduction of friction torque due to increase of temperature of various oils and increase of vaporizing rate of fuel due to increase of temperature in the vicinity of the intake port. The amount of supplementary correction is set by environmental conditions such as water temperature and the amount of fuel injection is slightly changed when environmental condition is changed. Further, as shown in FIG. 6(*c*) to FIG. 6(*f*), there may be a case where the amount of fuel injection at every ignition is changed extremely according to the fuel injection pattern. The injection amounts indicated by circled numerals in FIG. 6 are sucked in the intake strokes indicated by the same circled numerals and fuel amounts indicated by circled 1 and circled 2 are small and fuel amounts indicated by circled 3 and circled 4 are substantially large since fuel for 2 injections is sucked simultaneously.

In the present invention, the properties of fuel is determined on the basis of difference of change of ion current parameter due to difference in amount of fuel attributing to combustion caused by difference in vaporizing rate of the fuel. When the injection amounts of fuel are extremely different, the amount of fuel attributing to combustion and the ion current parameter are extremely changed, so that there is a possibility of erroneous determination. By correcting the ion current parameter on the basis of the amount of fuel injection, the influence on ion current parameter, which is increased extremely due to the difference in injection amount of fuel indicated by the circled numerals, can be removed. Since there may be a control method, which can prevent extreme difference in injection amount of fuel between cylinders due to injection pattern and difference in injection amount of fuel every trial by correction method, the above mentioned matter can be omitted in such control method.

Figure 11:
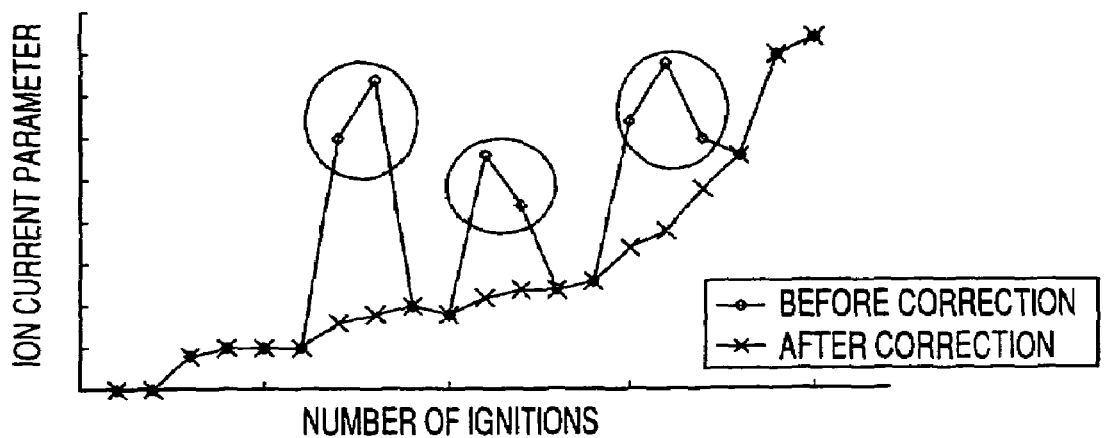
FIG. 11 is a graph showing an effect when the ion current parameter is corrected by the amount of fuel injection.
Figure 22:
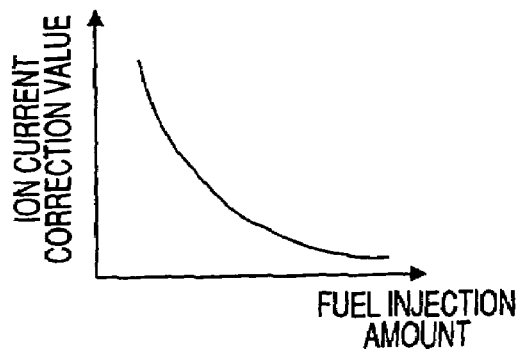
FIG. 22 is a graph showing a relation between the ion current correction value and the amount of fuel injection.

In the ion current parameter correction (fuel) calculation routine shown in FIG. 10, the ion current parameter (Ion_Store(n)) recorded in the previously described ion current parameter calculation routine is read in the step S601 and the amount of fuel injection memory (Ta_Store(n)) recorded in the control parameter (fuel) detection routine (see FIG. 9) is read in the step S602. Next, the ion current parameter correction value for the amount of fuel injection is introduced from FIG. 22 in the step S603, the ion current parameter read in the step S604 is corrected by the ion current correction value (CIon(n)) and the operation is returned to the fuel condition determination routine in FIG. 8. A result of correction is shown in FIG. 11. By correcting the calculated ion current parameter according to the amount of fuel injection, which may attribute to generation of ion current, the ion current parameter, which is varied due to difference in injection amount of fuel, is normalized, so that the erroneous determination in the fuel condition determination can be restricted.

Figure 8:
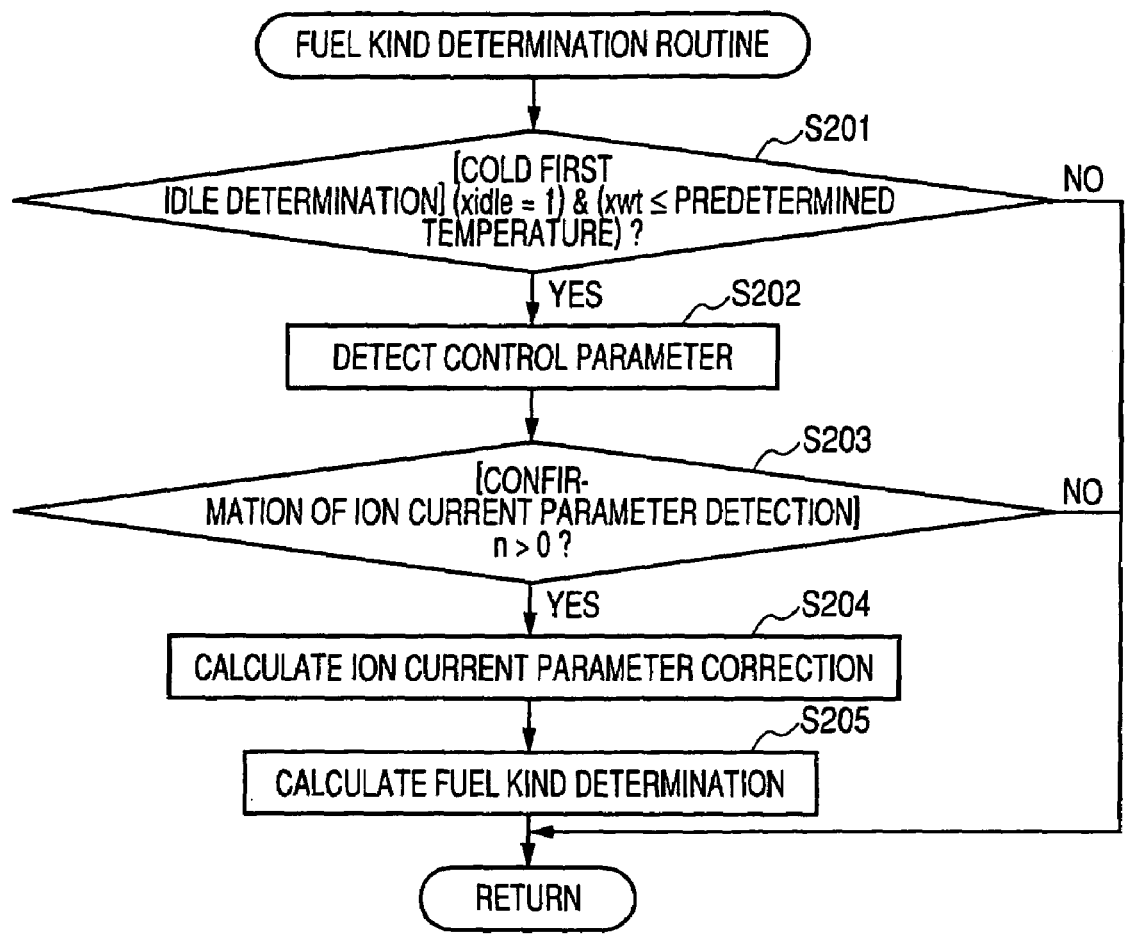
FIG. 8 is a flowchart showing the fuel characteristics determination routine used in a first embodiment of the present invention.
Figure 9:
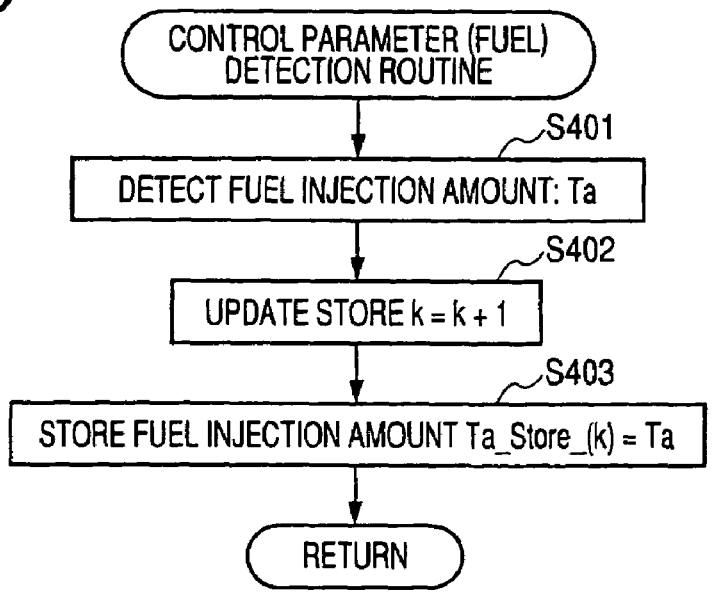
FIG. 9 is a flowchart showing the control parameter (fuel) detection routine used in a first embodiment to a third embodiment of the present invention.
Figure 12:
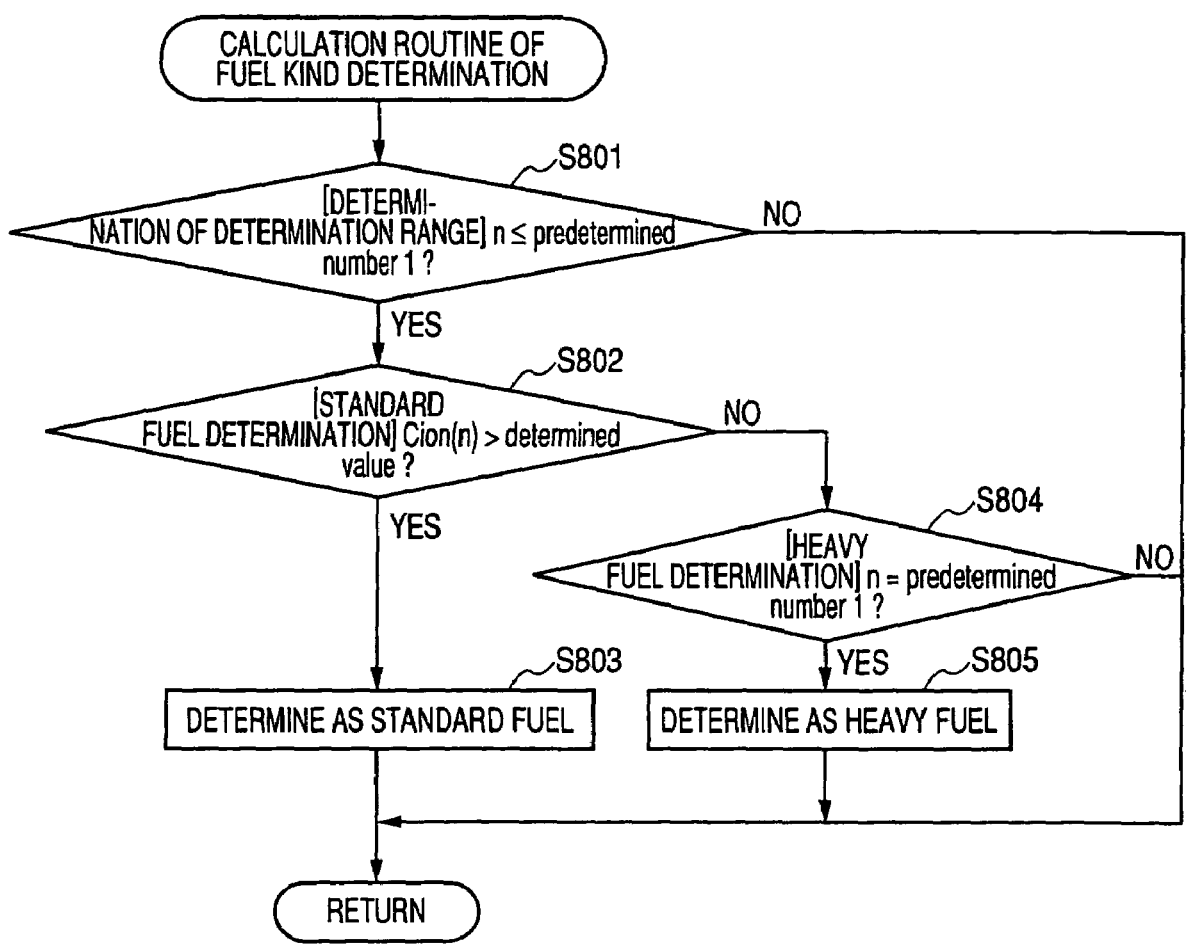
FIG. 12 is a flowchart showing the fuel condition determination calculation routine used in the first embodiment of the present invention.

Returning to the fuel proportions and condition determination routine shown in FIG. 8, the calculation of fuel proportions and condition determination using the ion current parameter corrected on the amount of fuel injection is executed in the step S205 according to the fuel proportions and condition determination calculation routine shown in FIG. 12. In FIG. 12, it is determined in the step S801 whether or not the number of records (n) of the ion current parameter is a predetermined number 1 or less, that is, whether or not the number of ignitions is a predetermined number or less. When the number of ignitions is the predetermined number 1 or more, the fuel proportions and condition determination is ended and this routine is ended. When the number of ignitions is the predetermined number 1 or less, the high evaporated fuel is detected in the step S802. When it is determined in the step S802 that the ion current parameter (CIon(n)) corrected on the basis of the amount of fuel injection is the determined value or more, the fuel used is determined as high evaporated fuel in the step S803.

When the ion current parameter is the determined value or less, the fuel used is determined as low evaporated fuel in the step S804. In the step S804, it is determined whether the number of ignitions becomes the predetermined number 1 and, when the number of ignitions is the predetermined number 1 or less, this routine is ended and, after a half rotation (after next ignition), this routine is performed again. On the other hand, when it is determined in the step S804 that the number of ignitions becomes the predetermined number 1 and low evaporated fuel is used. Therefore, it is determined that the ion current parameter (CIon(n)) is maintained small in a time period from the start time of engine to a time of the predetermined number of ignitions and the fuel is determined as low evaporated fuel in the step S805.

Figure 13:
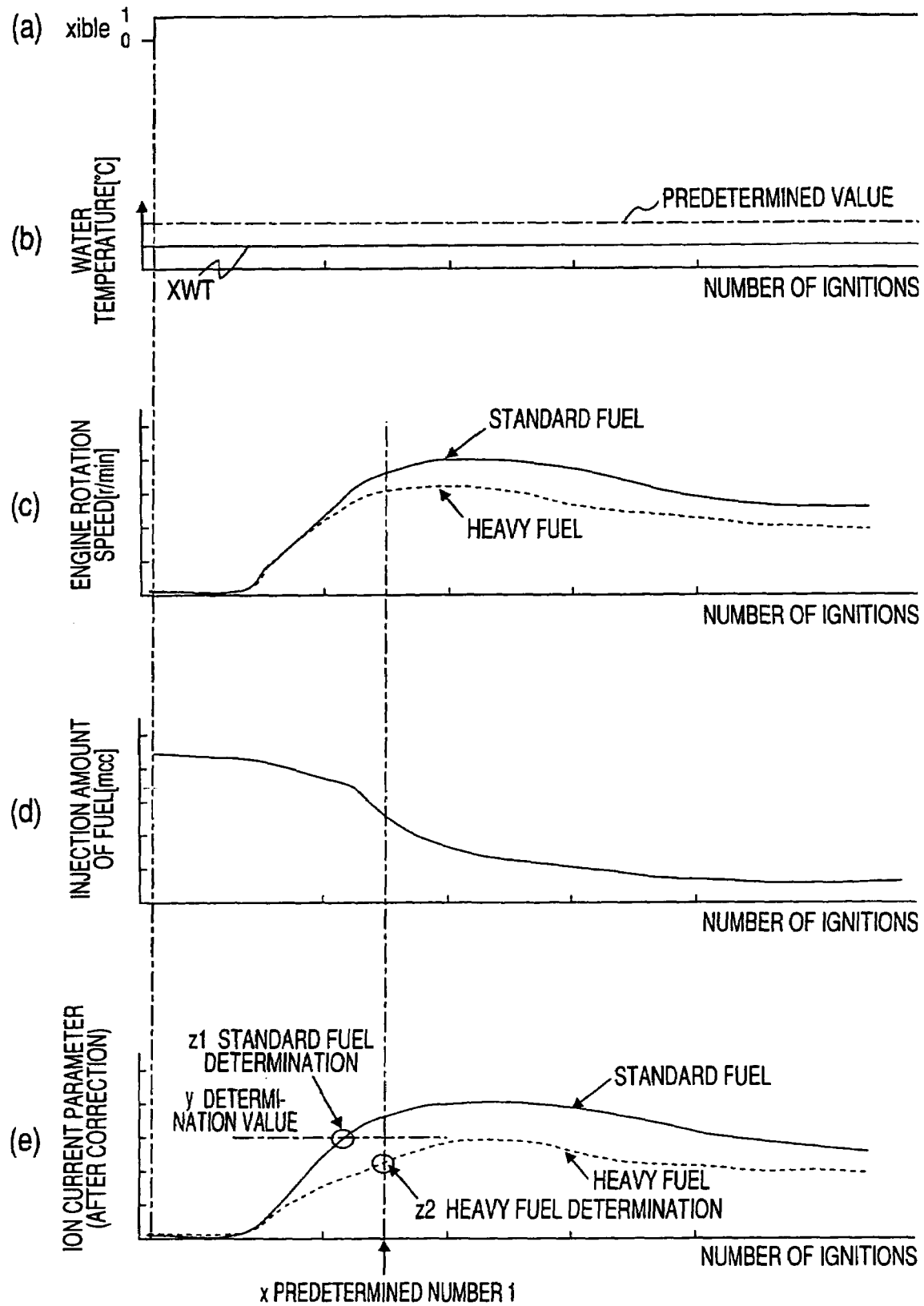
FIG. 13 is a timing chart showing an operation of the first embodiment of the present invention.

A result of execution of the flowcharts shown in FIGS. 7, 8 and 12 will be described with reference to a timing chart shown in FIG. 13. In FIG. 13, abscissa indicates the number of ignitions and FIG. 13(*a*) is the idle determination, FIG. 13(*b*) is water temperature, FIG. 13(*c*) is engine rotation speed, FIG. 13(*d*) is injection amount of fuel and FIG. 13(*e*) is ion current parameter (after corrected). Incidentally, the behavior when high evaporated fuel is used is indicated by a solid line and that when low evaporated fuel is used is indicated by a dotted line. In order to perform the cold first idle determination simultaneously with the engine start, it is confirmed that the idle determination (xidle=1) in FIG. 13(*a*) and water temperature (xwt) in FIG. 13(*b*) are predetermined values or less.

When these conditions are established, the fuel properties and condition determination is performed by the ion current parameter indicative of the combustion state corrected by the amount of fuel injection. As shown in FIG. 13(e), the high evaporated fuel determination is completed at a time z1 when the ion current parameter exceeds the determined value y under condition that the number of ignitions from the engine start is within the predetermined number 1 shown by x. On the other hand, when the ion current parameter does not exceed the determined value under condition that the number of ignitions from the engine start is within the predetermined number 1, low evaporated fuel is determined at a time point z2 when the number of ignitions becomes the predetermined number 1.

As described previously, when high evaporated fuel is used at the start time of cold internal combustion engine, vaporizing rate is better than that when low evaporated fuel is used. Therefore, the amount of fuel sucked in the combustion chamber and attributing to combustion is larger and the amount of fuel itself is larger. Consequently, the combustion state at every ignition is good and temperature in the vicinity of the intake port tends to easily rise. As a result, collaboration effect of further increase of vaporizing rate and amount of fuel sucked is obtained, so that the change of combustion state from the engine start is large and the change of the ion current parameter indicative of the burning state becomes large. On the other hand, when low evaporated fuel is used, the combustion state is bad due to low vaporizing rate and the temperature rise in the vicinity of the inlet port is low, so that the change of combustion state hardly occur or small if any.

As described, in the first embodiment, the properties of fuel is determined in the cold engine starting by utilizing the difference of change of combustion state from the engine start time due to difference in properties of fuel, in concrete, by utilizing the ion current parameter in the time period from the engine start to the predetermined ignition number 1, in which the largest difference in properties of fuel appears, it is possible to determine the properties of fuel at an early timing.

Embodiment 2

Figure 7:
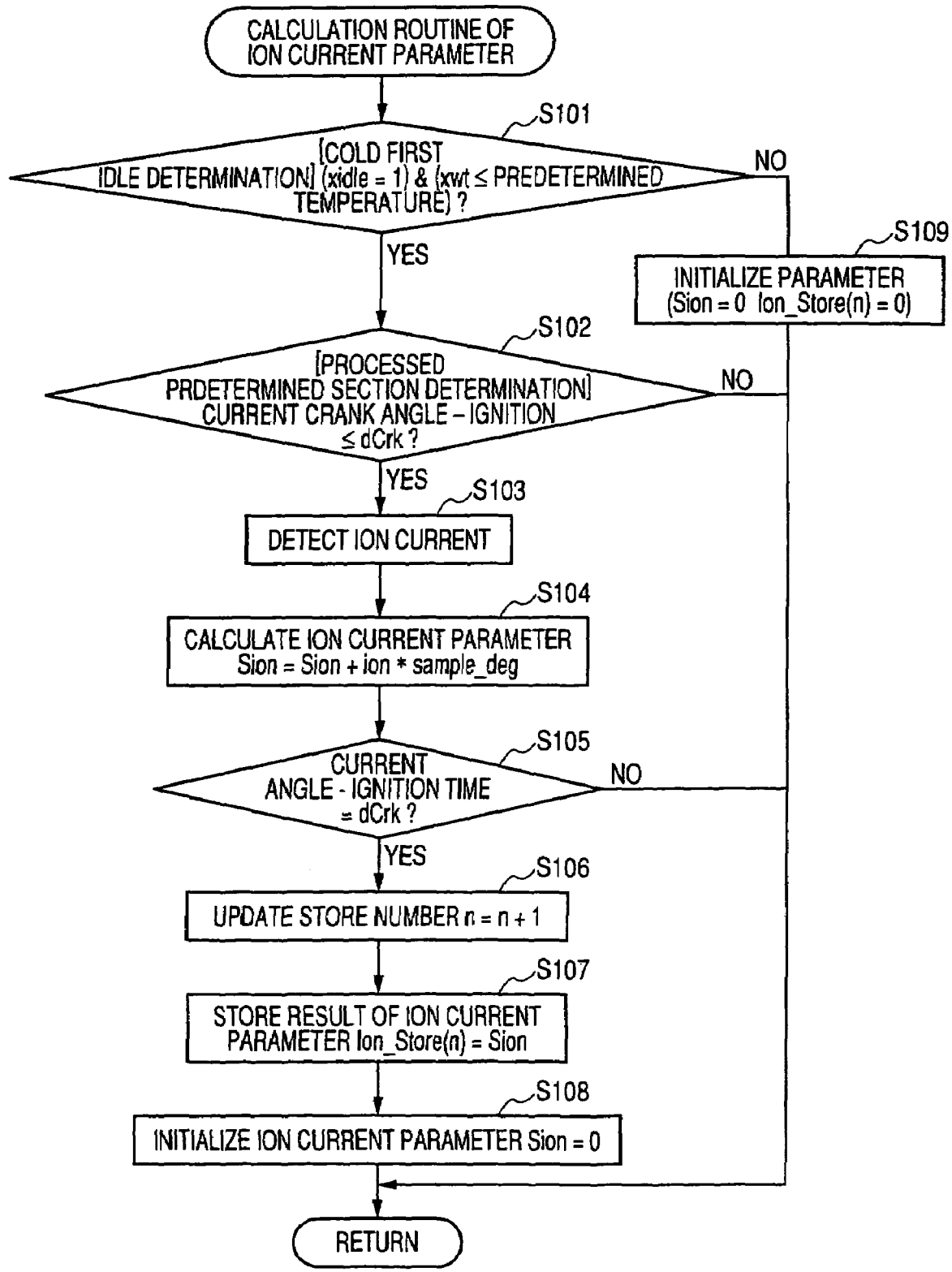
FIG. 7 is a flowchart showing the ion current parameter calculation routine used in all of embodiments of the present invention.

In the second embodiment, the construction of the internal combustion shown in FIG. 1 and the ion current parameter calculation shown in FIG. 7 are the same as those of the first embodiment. Although, in the first embodiment, the determination of properties of fuel is performed by comparing the ion current parameter with the determined value within the predetermined number of ignition in FIGS. 8 and 12, the properties of fuel is determined in the second embodiment by detecting the amount of change of the ion current parameter indicative of the change of combustion state from the engine start. Incidentally, the basic thought of determination of properties of fuel is the same as that described with reference to FIG. 5.

The determination of properties of fuel in the second embodiment will be described with reference to FIG. 14. The steps S301 to S304 are similar to those in the first embodiment as described with reference to FIG. 8 and, in the step S304, the ion current parameter detected every half rotation is corrected on the basis of the amount of fuel injection. In the step S305, in order to calculate the amount of change of ion current parameter indicative of the change of combustion state from the engine start, which does not exist in the first embodiment, the ion current parameter change calculation routine shown in FIG. 15 is executed. In the step S901 shown in FIG. 15, it is determined whether the number of records (n) of ion current parameter is a predetermined number 2 or more.

It is important that the amount of change of ion current parameter is calculated when the predetermined number 2 is 20 ignitions or less so that the properties of fuel can be determined earlier without error. Since, when the number of records is the predetermined number 2 or less, it is too small and impossible to calculate the amount of change of ion current parameter in the step S903, the operation is returned to the fuel proportions and condition determination routine. When the number of records is determined as the predetermined number 1 or more, the calculation number (m) of the amount of change of ion current parameter is updated in the step S902 and a difference from the ion current parameter before the predetermined number 2 is calculated as the amount of change of ion current parameter and recorded in the ion current change memory (Com_cond(m)) and then returned to the fuel proportions and condition determination routine shown in FIG. 14 After the number of records of ion current parameter from the engine start becomes the predetermined number 2 or more, the amount of change of ion current parameter is recorded in the memory every half rotation, that is, every ignition. Incidentally, although the difference between the predetermined detection numbers is used as the amount of change of ion current parameter in this embodiment, it may be possible to use other indicator indicative of the amount of change.

Figure 14:
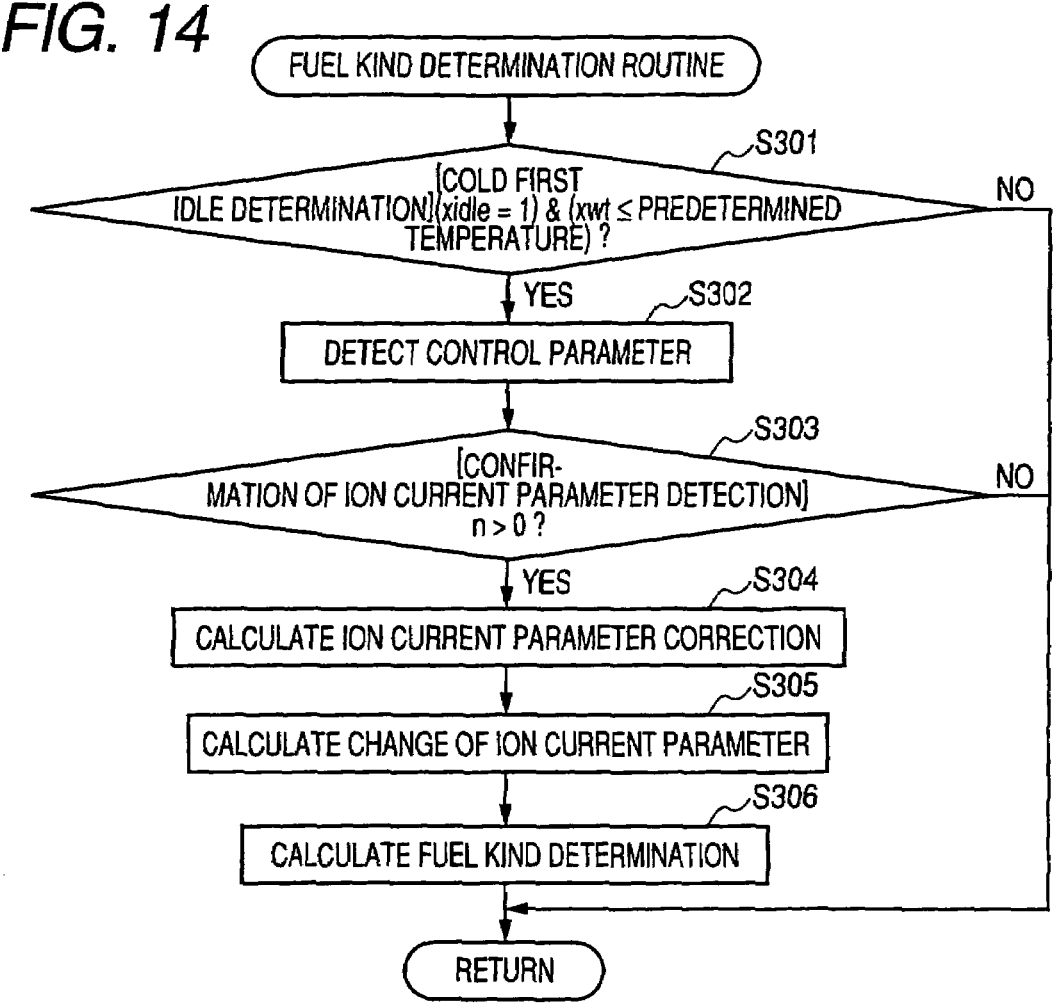
FIG. 14 is a flowchart showing the fuel characteristics determination calculation routine used in the second embodiment and the third embodiment of the present invention.
Figure 15:
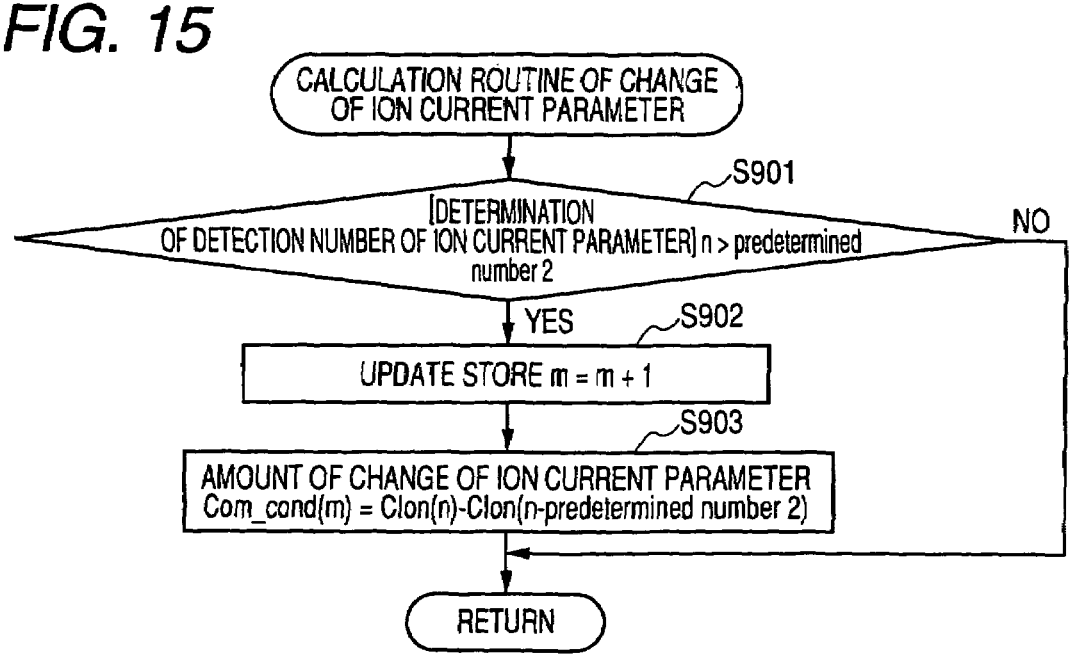
FIG. 15 is a flowchart showing the ion current parameter calculation routine used in the second embodiment and the third embodiment of the present invention.
Figure 16:
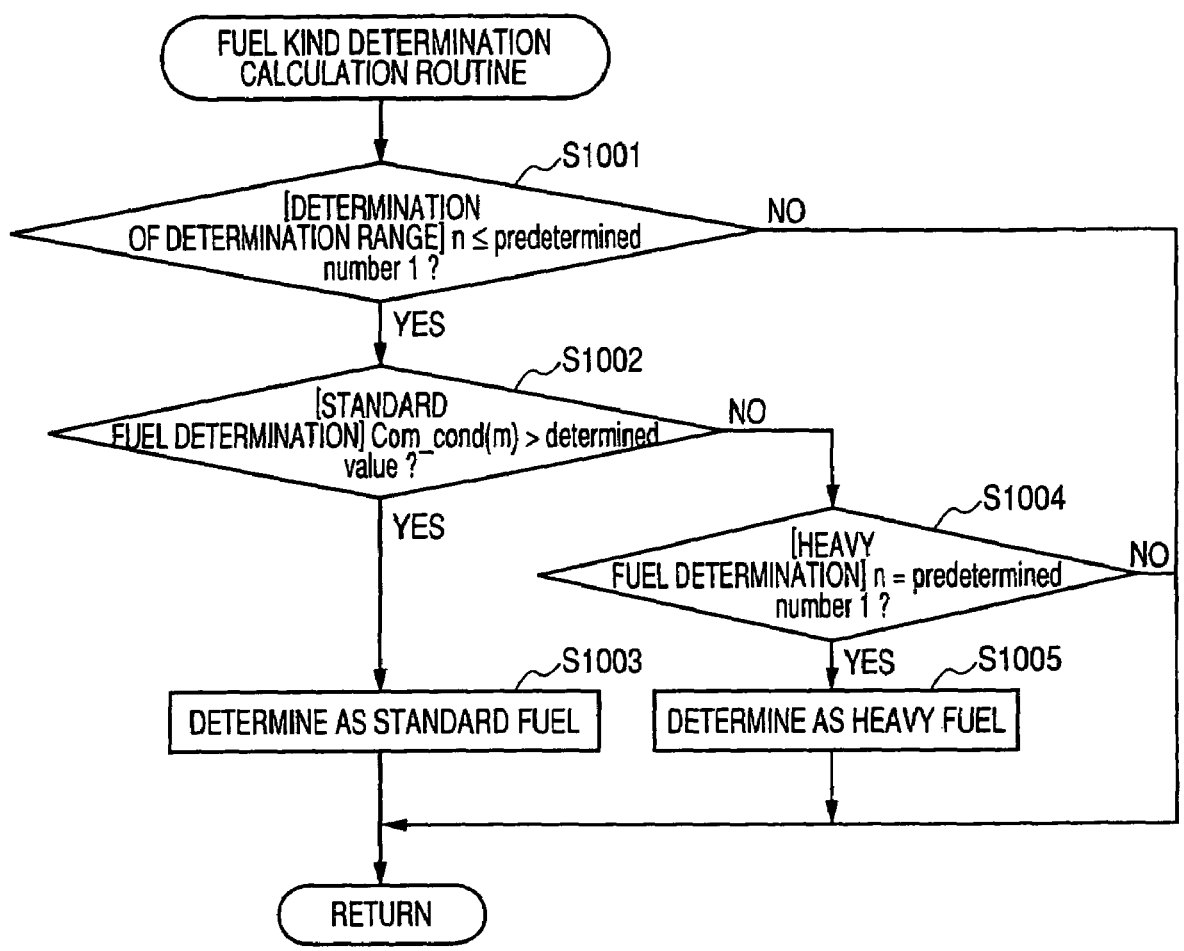
FIG. 16 is a flowchart showing the fuel characteristics determination calculation routine used in the second embodiment of the present invention.

Then, the operation is returned to the fuel proportions and condition determination routine shown in FIG. 14. In the step S306, the fuel proportions and condition determination calculation using the amount of change of ion current parameter is executed in the fuel proportions and condition determination calculation routine shown in FIG. 16. The determination method of fuel proportions and condition shown in FIG. 16 is substantially the same as that of the first embodiment except only the determination indicator used in the fuel condition determination. In the second embodiment, when it is determined in the step S1002 that the amount of change of ion current parameter (Com_cond(m)) is the predetermined value or more, high evaporated fuel is determined in the step S1003 and, when the number of ignitions becomes the predetermined number 1 while the amount of change of ion current parameter is the determined value or less (the step S1004), low evaporated fuel is determined in the step S1005. Incidentally, when it does not become the predetermined number 1 in the step S1004, this routine is ended and the fuel condition determination is performed by this routine again after half rotation (after next ignition).

Figure 17:
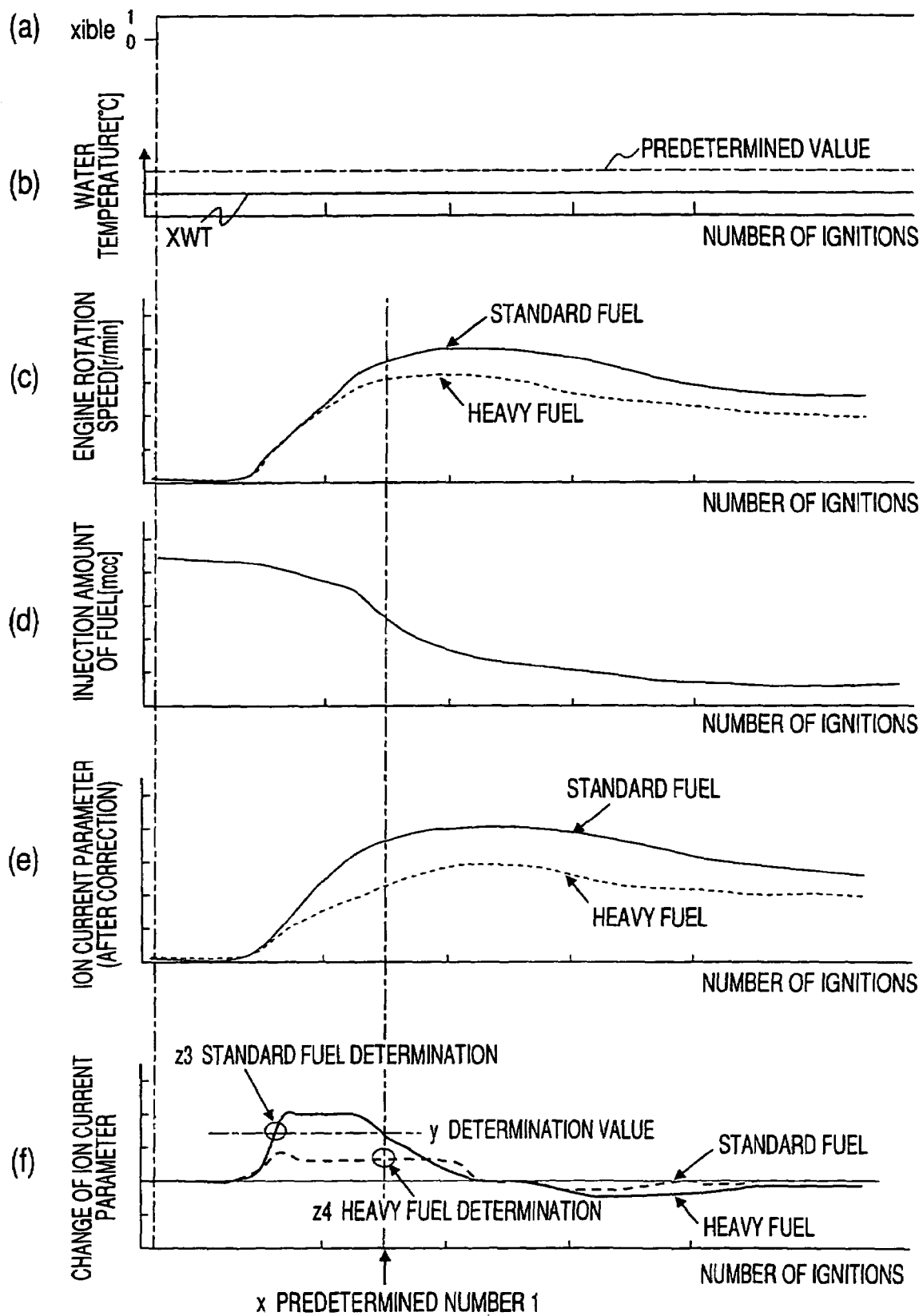
FIG. 17 is a timing chart showing an operation of the second embodiment of the present invention.

Now, a result of execution of the flowcharts shown in FIGS. 7, 14 and 16 showing the second embodiment will be described with reference to a timing chart shown in FIG. 17. In FIG. 17, FIGS. 17(a) to 17(e) are the same as those in FIG. 13 and FIG. 17(f) indicates the amount of change of ion current parameter. Incidentally, the behavior when high evaporated fuel is used is indicated by a solid line and that when low evaporated fuel is used is indicated by a dotted line. In order to perform the cold first idle determination simultaneously with the engine start, it is confirmed that the idle determination (xidle=1) in FIG. 17(a) and water temperature (xwt) in FIG. 17(b) are predetermined values or less.

When the conditions are established, the determination of properties of fuel is performed by calculating the ion current parameter indicative of the combustion state corrected by the amount of fuel injection (FIG. 17(e)) and calculating the amount of change of ion current parameter shown in FIG. 17(f) as the amount of change of combustion state by using the difference of ion current parameter when the ignition number is within the predetermined number 2. As shown in FIG. 17(f), when the number of ignitions from the engine start is within the predetermined number 1 shown by x in the same figure, the high evaporated fuel determination is completed at the time z3 when the ion current parameter exceeds the determined value y. When the number of ignitions from the engine start is within the time from the engine start to the predetermined number 1 and the ion current parameter does not exceed the determined value, the low evaporated fuel determination is completed at the time z4.

As described, in the second embodiment, the determination of properties of fuel is performed by using, at the start time of cold internal combustion engine, the amount of change of combustion state as the indicator for detecting the difference of the combustion state from the engine start due to the above mentioned difference of properties of fuel. In concrete, since the determination of properties of fuel is performed by utilizing the amount of change of ion current parameter between the engine start and the predetermined ignition number 1 in which the difference of properties of fuel appears extremely, it is possible to perform the determination of properties of fuel at an earlier timing.

Embodiment 3

In the third embodiment, the construction of the internal combustion shown in FIG. 1 and the ion current parameter calculation shown in FIG. 7 are the same as those of the second embodiment. Although, in the second embodiment, the determination of properties of fuel is performed by detecting the amount of change of ion current parameter, which is indicative of the change of burning state from the engine start in FIGS. 14 and 16, the properties of fuel is determined in the third embodiment by counting the number of cases when the amount of change of ion current parameter calculated in the second embodiment exceeds the determined value in the third embodiment. Incidentally, the basic thought of determination of properties of fuel is the same as described with reference to FIG. 5.

The fuel proportions and condition determination routine in the third embodiment will be described with reference to FIG. 14. The steps S301 to S305 are similar to those in the second embodiment and, in the step S306, the fuel proportions and condition determination calculation routine shown in FIG. 18, in which the fuel proportions and condition determination is performed by counting the number of cases where it is determined that the amount of change of ion current parameter is large, is executed. First, in the step S1101, it is determined whether the number of records (n) of ion current parameter is a predetermined number 1 or less, that is, whether the number of ignitions is the predetermined number or less. When it is the predetermined number 1 or more, the fuel proportions and condition determination was completed and this routine is ended. When it is the predetermined number 1 or less, a temporary high evaporated fuel determination of whether or not the amount of change of ion current parameter is performed in the step S1102. When it is larger than the predetermined value, there is a possibility of high evaporated fuel since the amount of change of burning state. Therefore, in the step S1103, the temporary high evaporated fuel determination number (good) is added by +1 and the operation is shifted to the step S1104. When it is the predetermined value or less, the operation is shifted to the step S1104 making a detour around the step S1103.

Then, the high evaporated fuel determination is performed in the step S1104 and, when the temporary high evaporated fuel determination number (good) is the determined number or more, it is determined as high evaporated fuel in the step S1105. When it is the determined number or less, it is determined in the step S1106 whether the number of records (n) of ion current parameter reaches the predetermined number 1. When it is determined that the number of records (n) of ion current parameter reaches the predetermined number 1, it is judged that the number of cases in which the amount of change of ion current parameter, which can be determined as high evaporated fuel within the predetermined number 1, is small and it is determined in the step S1107 as low evaporated fuel. Incidentally, when it does not reach the predetermined number 1, this routine is ended and the fuel condition determination is performed by this routine again after half rotation (after next ignition).

Figure 18:
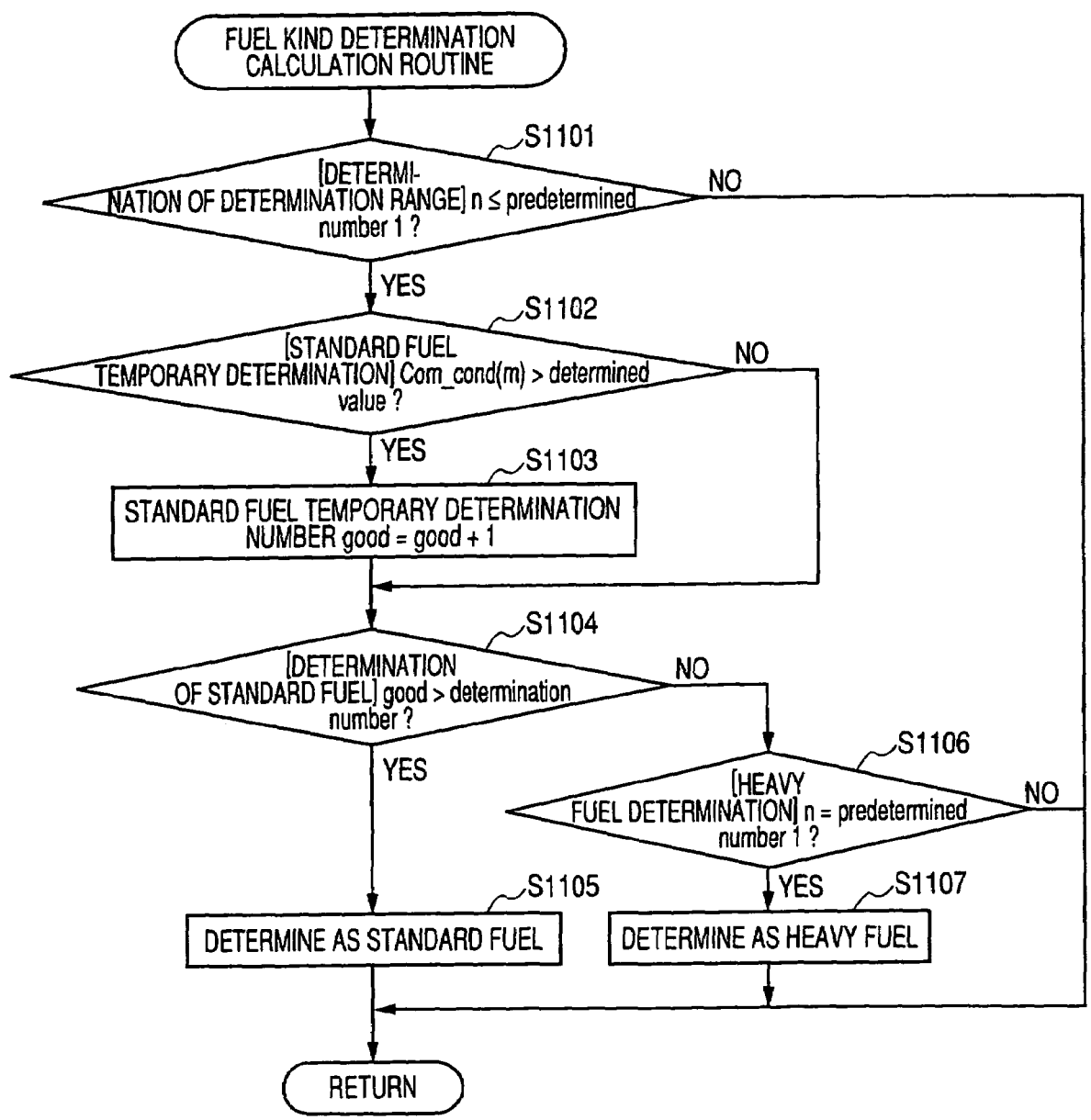
FIG. 18 is a flowchart showing the fuel characteristics determination calculation routine used in the third embodiment of the present invention.
Figure 19:
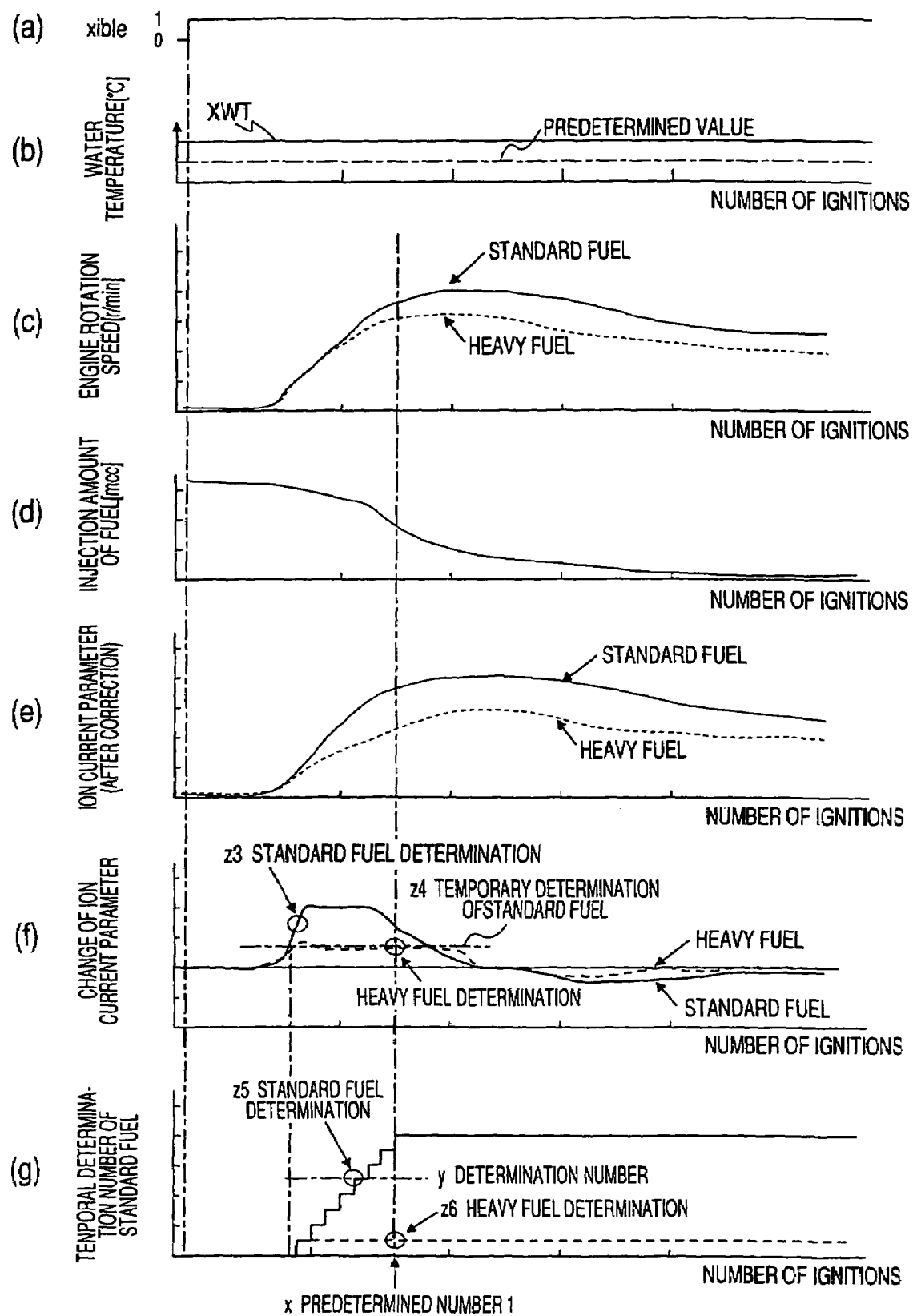
FIG. 19 is a timing chart showing an operation of the third embodiment of the present invention.

Now, a result of execution of the flowcharts shown in FIGS. 7, 14 and 18 showing the third embodiment will be described with reference to a timing chart shown in FIG. 19. In FIG. 19, FIGS. 19(a) to 19(f) are the same as those in FIG. 17 and FIG. 19(g) indicates the temporary high evaporated fuel determination number. Incidentally, the behavior when high evaporated fuel is used is indicated by a solid line and that when low evaporated fuel is used is indicated by a dotted line. In order to perform the cold first idle determination simultaneously with the engine start, it is confirmed that the idle determination (xidle=1) in FIG. 19(a) and water temperature (xwt) in FIG. 19(b) are predetermined values or less. When the conditions are established, the ion current parameter indicative of the burning state corrected by the amount of fuel injection (FIG. 19(e)) is calculated and, as the amount of change of burning state, the difference of the amounts of change of ion current parameter shown in FIG. 19(f) when the ignition number is within the predetermined number 2 is calculated.

Then, the number of cases when the amount of change of ion current parameter shown in FIG. 19(g) exceeds the temporary high evaporated fuel determination value is counted every ignition and the fuel proportions and condition determination is performed by the number of the temporary high evaporated fuel determinations. As shown in FIG. 19(g), when the number of ignitions from the engine start is within the predetermined number 1 shown by x in the same figure, the high evaporated fuel determination is completed at the time z5 when the number of the temporary high evaporated fuel determinations exceeds the determined number y. When the number of the temporary high evaporated fuel determinations does not exceed the determined number within the predetermined number 1, the fuel is determined as low evaporated fuel at the time z6, at which the ignition number becomes the predetermined number 1.

As described, in the third embodiment, the determination of properties of fuel is performed by using the number of cases where the amount of change of ion current parameter becomes the temporary high evaporated fuel determination value or more. Therefore, it is possible to perform the determination of properties of fuel at an earlier timing and it is possible to perform the fuel proportions and condition determination without error even when external disturbance occurs suddenly with respect to the ion current value.

Embodiment 4

As will be generally known, the combustion torque is varied by ignition timing. This fact suggests that the combustion state is changed by the ignition timing, that is, the ion current parameter indicative of combustion state is changed, so that there is a possibility of erroneous determination in the fuel proportions and condition determination. Therefore, similarly to the amount of fuel injection, it is necessary to correct the influence of different ignition timings correspondingly to the ignition timing every trial on the ion current parameter.

In the fourth embodiment, the construction of the internal combustion shown in FIG. 1 is used and the fuel proportions and condition determination is performed on the basis of the flowcharts shown in FIG. 8 of the first embodiment and in FIG. 14 of the second or third embodiment. Although, in the first to third embodiments, the ion current parameter is corrected by the amount of fuel injection detected by the control parameter (fuel) detection routine shown in FIG. 14 through the ion current parameter correction (fuel) calculation routine shown in FIG. 10, the ion current parameter in the fourth embodiment is corrected by the ignition timing detected by the control parameter (ignition) detection routine shown in FIG. 20 through the ion current parameter correction (ignition) calculation routine shown in FIG. 21.

Since portions of the fourth embodiment, which are different from those of the first to third embodiments, are small, only the different portions will be described.

Figure 20:
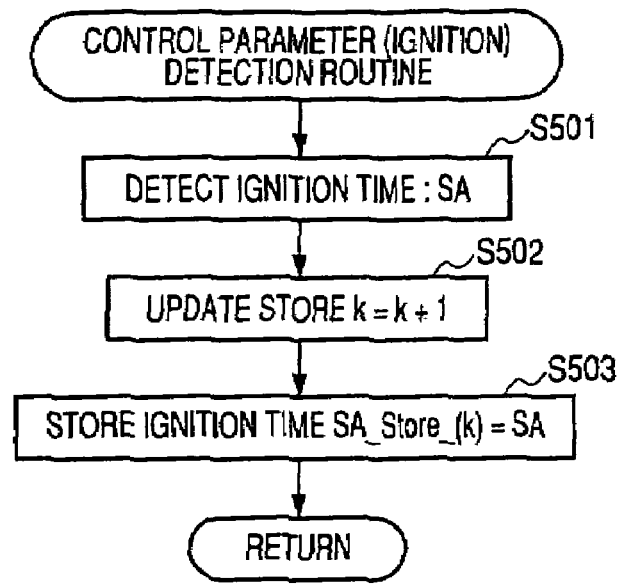
FIG. 20 is a flowchart showing the control parameter (ignition) detection routine used in a fourth embodiment.

The control parameter (ignition) detection routine of the fourth embodiment will be described wit reference to FIG. 20. First, the ignition timing (SA) is detected in the step S501, the number of records (k) is updated in the step S502, the ignition timing is recoded in the ignition timing memory (SA_Store(k)) in the step S503 and the operation is returned to the fuel proportions and condition determination routine. By this routine executed every half rotation, the ignition timings of all of the cylinders are recorded sequentially in the memory SA_Store(k), which are used in correcting the ion current parameter by the ignition timings.

Figure 21:
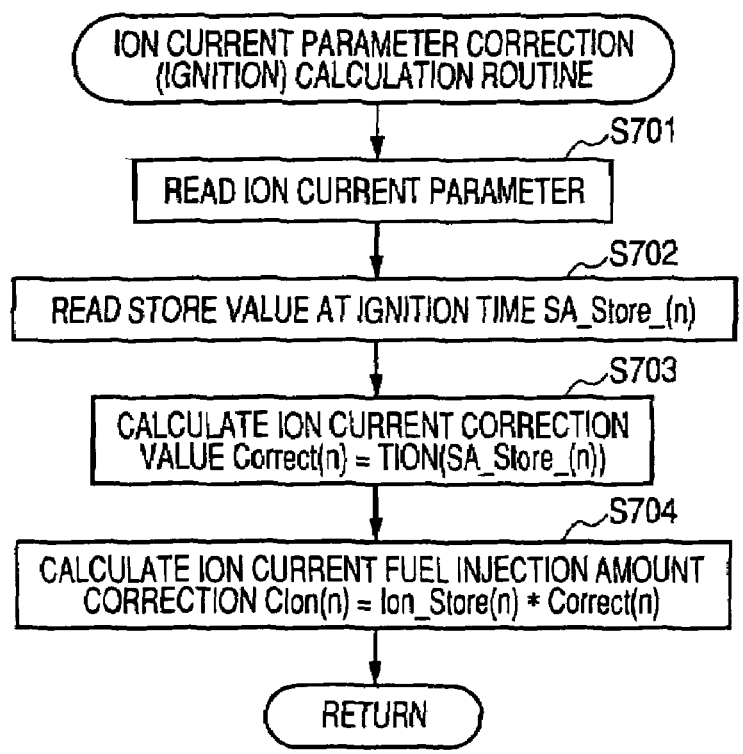
FIG. 21 is a flowchart showing the ion current parameter correction (fuel) calculation routine used in the fourth embodiment of the present invention.
Figure 23:
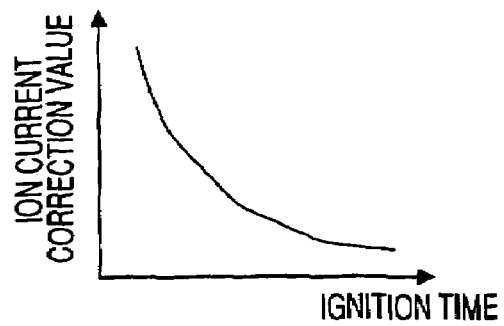
FIG. 23 is a graph showing a relation between the ion current correction value and the ignition timing.

Next, the correction of ion current parameter with the ignition timing will be described with reference to an ion current parameter correction (ignition) calculation routine shown in FIG. 21. First, the ion current parameter (Ion_Store(n)) recorded in the ion current parameter calculation routine is read in the step S701 and the ignition timing memory (SA_Store (n)) recorded in the control parameter (ignition) detection routine is read in the step S702. Then, the ion current parameter correction value (Correct(n)) for the ignition timing is derived from FIG. 23 in the step S703, the read ion current parameter is corrected by the ion current parameter correction value (CIon(n)) in the step S704 and the operation shifted to the fuel proportions and condition determination routine.

Since the ignition timing is set to the optimum ignition timing by totally determining the state of the engine on the basis of the engine rotation speed from the crank angle sensor and signals from other sensors, the ignition timing is changed every ignition similarly to the amount of fuel injection at the engine start time. It is generally known that combustion torque is changed by ignition timing and the ion current parameter indicative of combustion state is changed by the change of combustion torque.

Figure 24:
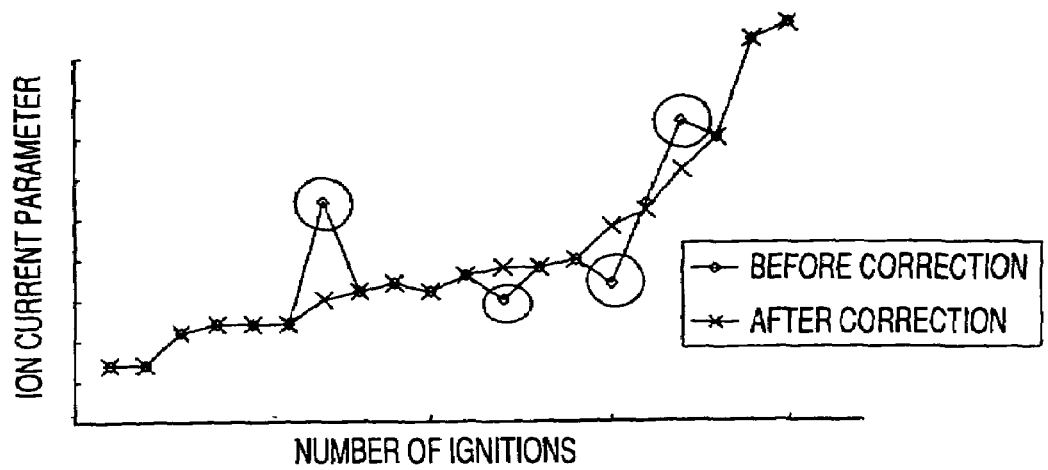
FIG. 24 is a graph showing an effect when the ion current parameter is corrected by the ignition timing.

FIG. 24 shows a result of correction of variation of ion current parameter due to ignition timing on the basis of the ignition timing by execution of the fourth embodiment. Incidentally, circled portions in FIG. 24 indicate portions in which the ignition timing is shifted. In behavior before the correction, the ion current parameter is shifted when ignition timing is shifted on lead angle side or lag angle side. The problem of this shift can be solved by correcting the ion current parameter on the basis of ignition timing. Therefore, the influence of the difference of ignition timing every trial on the ion current parameter can be removed. By correcting the calculated ion current parameter with the ignition timing, which may attribute to generation of ion current, ion current parameter varied by the difference of ignition timing is normalized, so that the erroneous determination in the fuel proportions and condition can be restricted.

As such, in the fourth embodiment, by correcting ion current parameter by ignition timing, which influences ion current similarly to the amount of fuel injection, the effect similar to the correction by injection amount of fuel can be obtained. As a result, the fuel proportions and condition determination is performed without error, similarly to the first to third embodiments.

What is claimed is:

1. An internal combustion engine control device comprising: ion current detection means for detecting ion current corresponding to an amount of ions produced by combustion of air fuel mixture in a cylinder of the internal combustion engine; and ion current parameter calculation means for calculating an ion current parameter, indicative of burning state at every ignition, from the ion current detected by said ion current detection means, and for determining properties of the fuel corresponding to a change of the ion current parameter in a time period from an engine start time to a predetermined number of ignitions.

2. An internal combustion engine control device as claimed in claim 1, further comprising fuel proportions and condition determination means for determining fuel as high evaporated fuel, when the ion current parameter exceeds a predetermined value in the period from the engine start time to the predetermined number of ignitions, and as low evaporated fuel when the ion current parameter does not exceed the predetermined value in the period from the engine start time to the predetermined number of ignitions.

3. An internal combustion engine control device as claimed in claim 1, further comprising ion current parameter change calculation means for calculating an amount of change of ion current parameter indicative of combustion state and fuel proportions and condition determination means for determining fuel as high evaporated fuel when the amount of change of the ion current parameter exceeds a predetermined value in the period from the engine start time to the predetermined number of ignitions and as low evaporated fuel when the ion current parameter does not exceed the predetermined value in the period from the engine start time to the predetermined number of ignitions.

4. An internal combustion engine control device as claimed in claim 1, wherein said predetermined number of ignitions from the engine start time is 20 ignitions or less.

5. An internal combustion engine control device as claimed in claim 1, further comprising ion current parameter change calculation means for counting cases where the amount of change of the ion current parameter exceeds a predetermined number, and fuel proportions and condition determination means for determining fuel as high evaporated fuel, when the number of the cases exceeds a predetermined value in the period from the engine start time to the predetermined number of ignitions and as low evaporated fuel when the number of the cases does not exceed the predetermined value in the period from the engine start time to the predetermined number of ignitions.

6. An internal combustion engine control device as claimed in claim 1, further comprising fuel injection amount detection means for detecting an injection amount of fuel of the internal combustion engine, wherein the ion current parameter indicative of the combustion state is corrected on the basis of the amount of fuel injection.

7. An internal combustion engine control device as claimed in claim 1, further comprising ignition timing detection means for detecting ignition timing of the internal combustion engine, wherein the ion current parameter indicative of the combustion state is corrected on the basis of the ignition timing.

8. An internal combustion engine control device as claimed in claim 2, wherein the determination by said fuel proportions and condition determination means is executed in a cold first idle time to determine the properties of the fuel.

9. An internal combustion engine control device as claimed in claim 3, wherein the determination by said fuel proportions and condition determination means is executed in a cold first idle time to determine the properties of the fuel.

10. An internal combustion engine control device as claimed in claim 5, wherein the determination by said fuel proportions and condition determination means is executed in a cold first idle time to determine the properties of the fuel.

* * * * *